Sept. 8, 1942.  G. N. ROSA  2,295,052
METHOD OF CUTTING RAILS
Filed July 29, 1940   2 Sheets-Sheet 1
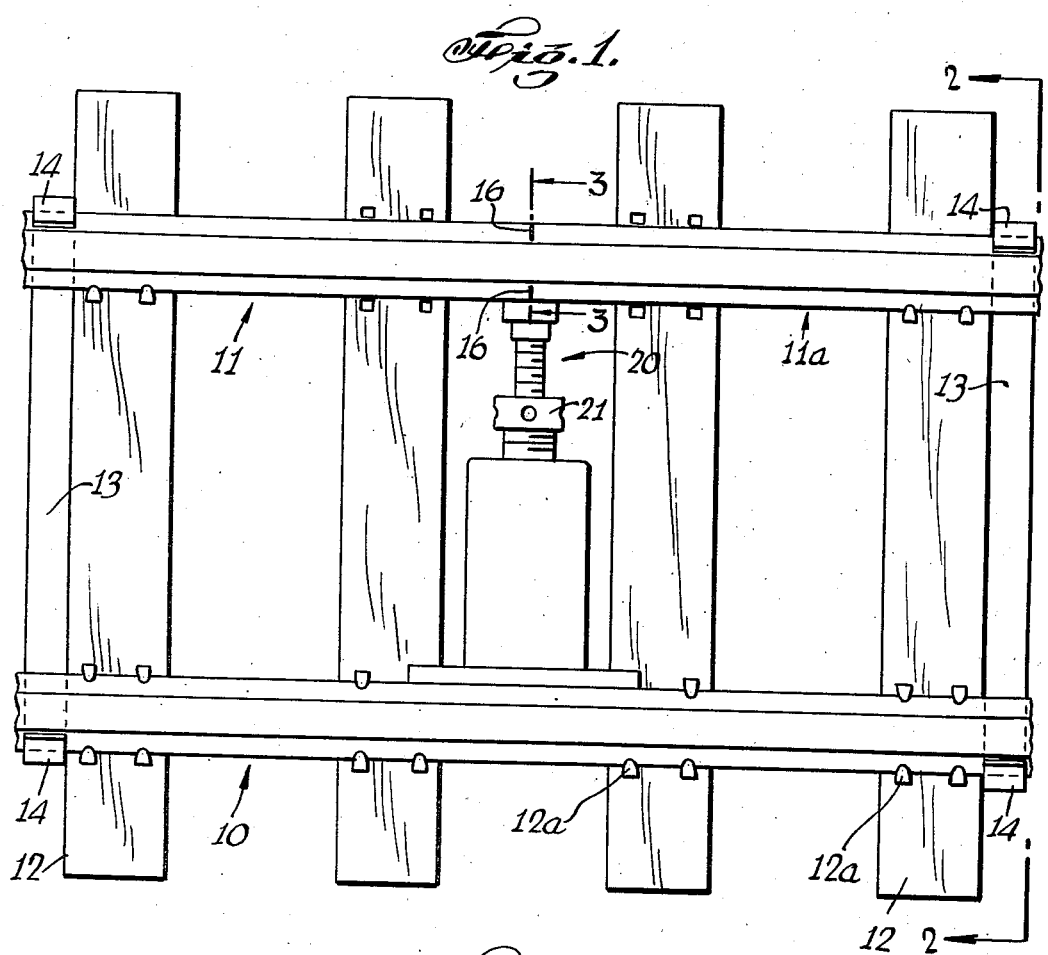
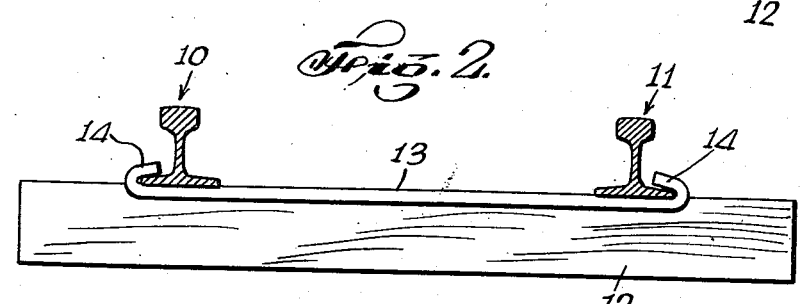
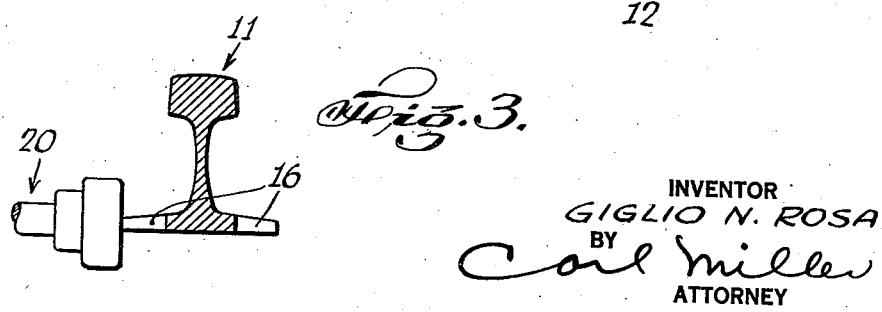
INVENTOR
GIGLIO N. ROSA
BY
Carl Miller
ATTORNEY Sept. 8, 1942.  G. N. ROSA  2,295,052
METHOD OF CUTTING RAILS
Filed July 29, 1940  2 Sheets-Sheet 2
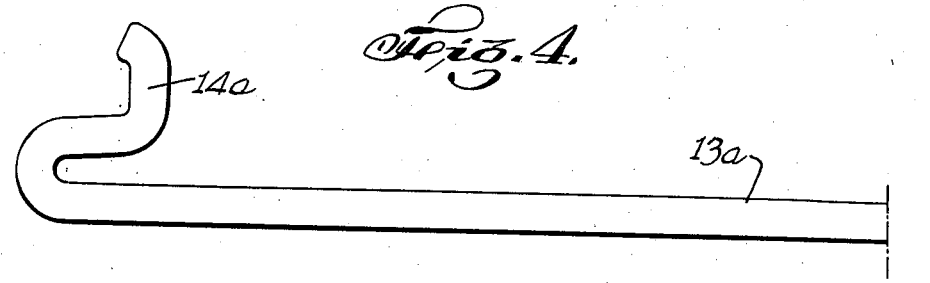
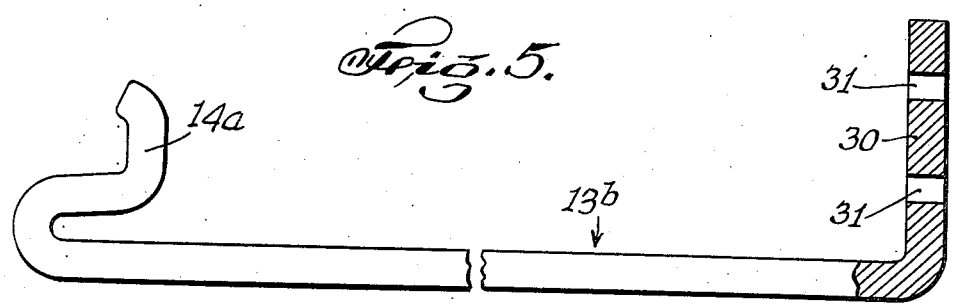
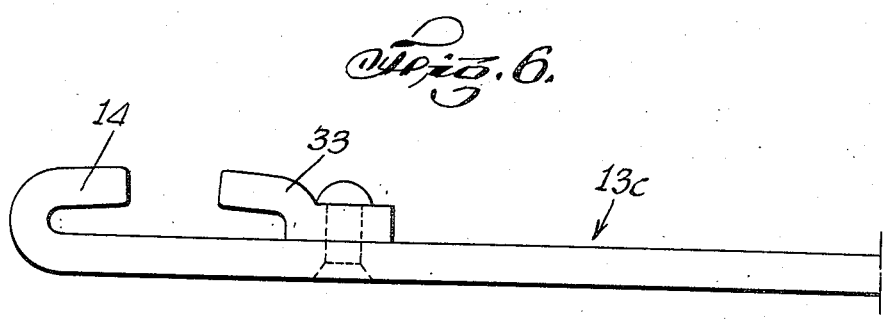
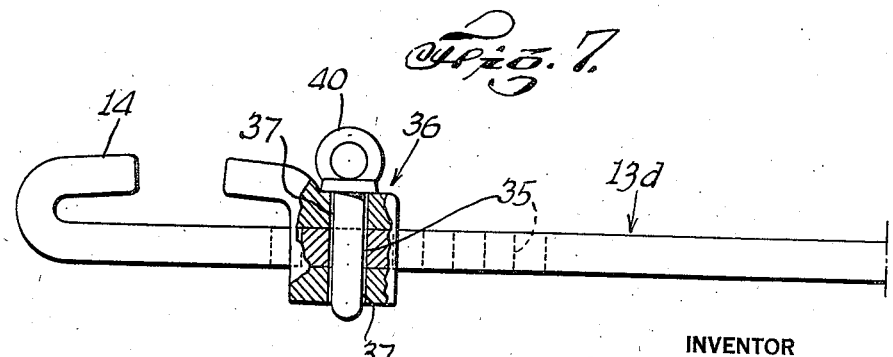
INVENTOR
GIGLIO N. ROSA
BY
Carl Miller
ATTORNEY Patented Sept. 8, 1942

2,295,052

UNITED STATES PATENT OFFICE 2,295,052

METHOD OF CUTTING RAILS

Giglio N. Rosa, New York, N. Y.

Application July 29, 1940, Serial No. 348,101

2 Claims. (Cl. 29—66)

This invention relates to methods of and apparatus for cutting rails or the like iron or steel bars.

An object of this invention is to provide a highly improved method of cutting iron rails or beams, such as railroad rails, third rails, building I beams or T beams or channels or T beams, or other rods or bars.

A further object of this invention is to provide improved apparatus for carrying out the method embodying the invention.

Yet another object of this invention is to provide a simple and economical method of the character described, which shall be easy to carry out, and which shall yet be efficient and practical to a high degree.

Other objects of this invention will in part be obvious and in part hereinafter pointed out.

The invention accordingly consists in the combination of steps, features of construction, combination of elements, and arrangement of parts which will be exemplified in the method and construction hereinafter described, and of which the scope of application will be indicated in the following claims.

In the accompanying drawings, in which is shown various possible illustrative embodiments of this invention, Fig. 1 is a top plan view of a portion of a railroad track with apparatus in position for cutting one of the rails;

Fig. 2 is a cross-sectional view taken on line 2—2 of Fig. 1;

Fig. 3 is a cross-sectional view taken on line 3—3 of Fig. 1;

Fig. 4 is a side elevational view of a portion of a rail interconnecting bar shown in Fig. 2, illustrating a modified construction;

Fig. 5 is a view similar to Fig. 4, but illustrating a still further modification;

Fig. 6 is a view similar to Fig. 4, and illustrating still another further modified construction; and Fig. 7 is a view similar to Fig. 6 and illustrating a connecting bar for rails of various sizes.

Referring now in detail to the drawings, and particularly to Figs. 1, 2 and 3, which illustrate the method of cutting a rail, 10 and 11 designate rails mounted on rail ties 12 and attached thereto by spikes 12a.

The apparatus for cutting the rail 11 comprises a pair of similar, parallel, interconnecting rods 13 to connect the rails 10 and 11. Each bar 13 has hooks 14 at its outer ends to engage the base 11a of the rail.

In carrying out my improved process, the connecting bars are preferably placed with four rail ties between the bars, as illustrated in Fig. 1. The spikes for the central two rail ties which attach the rail 11 to the rail ties are entirely removed. The spikes from the outer two rail ties engaging the outer edge of the rail 11, are also removed.

The base 11a of the rail 11 is then cut or notched with a hacksaw from opposite sides to a depth of one-half inch to one inch, as shown at 16, at the exact place where the cut is to be made.

Interposed between the rails 10 and 11, in alignment with the cuts 16, is a jack 20 of any suitable type. The jack 20 illustrated in Fig. 1 is lengthened by turning a screw member 21.

I have found that upon increasing the length of the jack, the rail 11 will be cut where it is notched. Obviously, any beam, rod or bar may be cut in a similar manner, it being a dominant feature of the invention to carry out the method by placing a bar parallel to the bar to be cut and interconnecting the two bars by a pair of spaced, similar, connecting members, notching the bar to be cut and interposing the jack between the two bars and then operating the jack to exert pressure at the point to cut the notched bar.

The removal of the spikes, as shown in Fig. 1, permits the rail to snap or give when pressure is applied with the jack.

In Fig. 4 there is shown an interconnecting bar 13a illustrating a modified construction. The bar 13a has hooks 14a at its outer ends to engage the base and flange of the rails.

In Fig. 5 the interconnecting bar 13b has a hook 14a at one end and is formed with an upwardly extending arm 30 at its other end formed with openings 31 to permit said arm to be bolted to one of the rails.

In Fig. 6 the interconnecting bar 13 has hooks 14 at its opposite ends. Fixed to the bar, however, are brackets 33 to engage the inner edges of the bases of the rails.

In Fig. 7 the bar 13d has hooks 14 at its outer ends, but is formed with a plurality of openings 35. Slidably mounted on the bar are brackets 36 formed with openings 37 registering with openings 35. The bracket 36 may be moved to various positions in which the openings 37 register with the openings 35. In each of these positions, a pin 40 may be inserted through the registering openings 35, 37 to hold the bracket 36 in place. With such construction, the interconnecting bar may be used with rails of various sizes, It will thus be seen that there is provided a device and method in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. A method of splitting one of a pair of rails, consisting in interconnecting said pair of rails by interconnecting bars at points on opposite sides of the point at which the split is to take place, notching the rail to be split at the point where the split is to take place, interposing a jack between the rails, with the jack engaging the rail to be cut at the point where it is notched and then elongating the jack to force the notched rail to split.

2. A method of splitting one of a pair of rails, consisting in interconnecting said pair of rails by interconnecting bars at points on opposite sides of the point at which the split is to take place, notching the rail to be split at the point where the split is to take place, removing the spikes which attach the outer edge of the rail to be split to the ties disposed between the interconnecting bars, interposing a jack between the rails, with the jack engaging the rail to be cut at the point where it is notched, and then elongating the jack to force the notched rail to split.

GIGLIO N. ROSA.